(12) United States Patent
Ni

(10) Patent No.: US 10,302,789 B2
(45) Date of Patent: May 28, 2019

(54) METHOD AND APPARATUS FOR ESTIMATING SOURCE SIGNATURE IN SHALLOW WATER

(71) Applicant: CGG SERVICES SA, Massy (FR)

(72) Inventor: Yuan Ni, Paris (FR)

(73) Assignee: CGG SERVICES SAS, Massy (FR)

( * ) Notice: Subject to any disclaimer, the term of this patent is extended or adjusted under 35 U.S.C. 154(b) by 331 days.

(21) Appl. No.: 15/124,484

(22) PCT Filed: Mar. 13, 2015

(86) PCT No.: PCT/IB2015/001002
§ 371 (c)(1),
(2) Date: Sep. 8, 2016

(87) PCT Pub. No.: WO2015/136379
PCT Pub. Date: Sep. 17, 2015

(65) Prior Publication Data
US 2017/0031044 A1     Feb. 2, 2017

Related U.S. Application Data

(60) Provisional application No. 61/952,900, filed on Mar. 14, 2014.

(51) Int. Cl.
*G01V 1/38* (2006.01)
*G01V 1/36* (2006.01)

(52) U.S. Cl.
CPC ............... *G01V 1/364* (2013.01); *G01V 1/38* (2013.01); *G01V 2210/1293* (2013.01); *G01V 2210/56* (2013.01)

(58) Field of Classification Search
CPC .. G01V 1/364; G01V 1/38; G01V 2210/1293; G01V 2210/56
See application file for complete search history.

(56) References Cited

U.S. PATENT DOCUMENTS

| 4,476,550 A | 10/1984 | Ziolkowski et al. |
| 4,476,553 A | 10/1984 | Ziolkowski et al. |
| (Continued) | | |

FOREIGN PATENT DOCUMENTS

| GB | 2433594 A | 6/2007 |
| WO | 2013/137974 A1 | 9/2013 |

OTHER PUBLICATIONS

International Search Report in related International Application No. PCT/IB2015/001002, dated Oct. 5, 2015.
(Continued)

*Primary Examiner* — Sujoy K Kundu
*Assistant Examiner* — Lynda Dinh
(74) *Attorney, Agent, or Firm* — Patent Portfolio Builders PLLC

(57) ABSTRACT

In order to use near-field measurements to obtain signature of a signal penetrating seafloor in a shallow water surveyed area, the water-bottom reflections' effect is removed. The removal is performed by obtaining first a far-field initial estimate from stacked primary pulses in the near-field measurements, and then estimating water-bottom reflection portions for different depths using differences between the near-field measurements and the far-field initial estimate. The signature of the air-gun for each shot is then deblended from the near-field measurement for the shot using the one of the water-bottom reflection portions according to a water-bottom depth associated with the shot location.

18 Claims, 6 Drawing Sheets

(56) References Cited

U.S. PATENT DOCUMENTS

| | | | |
|---|---|---|---|
| 4,648,080 | A | 3/1987 | Hargreaves |
| 4,658,384 | A | 4/1987 | Dragoset, Jr. et al. |
| 7,440,357 | B2 | 10/2008 | Hopperstad |
| 7,586,810 | B2 | 9/2009 | Davies et al. |
| 8,427,901 | B2 | 4/2013 | Lunde et al. |
| 8,553,497 | B2 | 10/2013 | Krohn |
| 2008/0043573 | A1* | 2/2008 | Bisley .................. G01V 1/28 367/24 |
| 2011/0063947 | A1* | 3/2011 | Norris ................ G01V 1/3808 367/21 |
| 2011/0120724 | A1 | 5/2011 | Krohn |
| 2012/0072115 | A1 | 3/2012 | Laws |
| 2012/0087207 | A1 | 4/2012 | Kostov et al. |
| 2013/0121109 | A1* | 5/2013 | Baardman .............. G01V 1/36 367/24 |
| 2013/0182533 | A1 | 7/2013 | Rentsch-Smith |
| 2013/0258808 | A1 | 10/2013 | Niang et al. |
| 2013/0325427 | A1 | 12/2013 | Hegna et al. |

OTHER PUBLICATIONS

Written Opinion of the International Searching Authority in related International Application No. PCT/IB2015/001002, dated Oct. 5, 2015.

P.N. Bierwirth et al., "Shallow Sea-Floor Reflectance and Water Depth Derived by Unmixing Multispectral Imagery", Photogrammetric Engineering & Remote Sensing, Mar. 1993, vol. 59, No. 3, pp. 331-338.

J.F. Hopperstad et al., "Source Signature Estimation—Attenuation of the Seafloor Reflection Error in Shallow Water", EAGE 68th Conference & Exhibition, Vienna, Austria, Jun. 12-15, 2006.

E. Kragh et al., "Source Signature Estimation—Attenuation of the Sea-Bottom Reflection Error from Near-Field Measurements", first break, Jun. 2000, vol. 18, No. 6, pp. 260-264.

G.E. Parkes et al., "The Signature of an Air Gun Array: Computation from Near-Field Measurements Including Interactions—Practical Considerations", Geophysics, Feb. 1984, vol. 48, No. 2, pp. 105-111.

F. Roth et al., "Improving Seabed Logging Sensitivity in Shallow Water Through Up-Down Separation", EGM 2007 International Workshop, Innovation in EM, Grav and Mag Methods:a new Perspective for Exploration, Capri, Italy, Apr. 15-18, 2007.

K. Yang et al., "Shallow Water Demultiple with Seafloor Reflection Modeling Using Multichannel Prediction Operator", SEG Technical Program Expanded Abstracts 2012.

A, Ziolkowski et al., "The Signature of an Air Gun Array: Computation from Near-Field Measurements Including Interactions ", Geophysics, Oct. 1982, vol. 47, No. 10, pp. 1413-1421.

* cited by examiner

METHOD AND APPARATUS FOR ESTIMATING SOURCE SIGNATURE IN SHALLOW WATER

CROSS REFERENCE TO RELATED APPLICATIONS

This application is a National Stage of International Application No. PCT/IB2015/001002, filed Mar. 13, 2015, which claims priority and benefit from U.S. Provisional Patent Application No. 61/952,900, filed Mar. 14, 2014, for "Extreme shallow water source signature estimation using near field hydrophone recording," the content of which are incorporated in their entirety herein by reference.

BACKGROUND

Technical Field

Embodiments of the subject matter disclosed herein generally relate to methods and apparatuses for estimating signatures characterizing signals penetrating the seafloor in shallow water, or more specifically, to methods and apparatuses able to estimate these signatures using near-field measurements without comprehensive knowledge of the water-bottom's depth and reflectivity in the survey area:

Discussion of the Background

In seismic surveying, seismic signals (i.e., pressure variations propagating in an explored volume) are used to investigate geophysical structures under the ground surface or under the seafloor. Seismic data representing reflections of the seismic signals in the investigated geophysical structure are acquired and processed to generate images of the investigated structure. These images may be used to evaluate oil and/or gas reservoirs. Improving seismic data acquisition and processing is an ongoing research topic.

During a marine seismic survey, a submerged seismic source generates signals at different horizontal locations in the surveyed area. The signals propagate in all directions linearly until encountering interfaces where the propagation velocity changes (e.g., at an interface between water and air, water to rock, shale to sand, etc.). At these interfaces, the signals are reflected, refracted and/or transmitted. Some of the signals' energy eventually reaches detectors in streamers towed or placed on the seafloor. The detectors (also known as receivers) are configured to record information (seismic data) related to the source-generated signals that traveled through the investigated geophysical structure.

Each recording in the seismic data is due to one receiver detecting energy after a shot and includes a convolution of the source signature (i.e., amplitude versus time characterizing the signal penetrating the seafloor following the shot) and the investigated structure's response function. The structure's response function associated with a location carries information about the nature and depth of interfaces between layers of the structure under the seafloor. During seismic data processing, the signature of the signal incident on the formation (i.e., penetrating the seafloor) is used to apply a designature procedure to the seismic data in order to extract the structure's response function. The structure response functions extracted from different recordings (and thus corresponding to different locations in the surveyed area) are then used to create the investigated structure's image(s).

Marine seismic sources usually include multiple individual sources that are fired substantially simultaneously to generate a seismic signal stronger than achievable with a single individual source. An individual source may be an air-gun or a cluster of air-guns. The shape of the signal (i.e., amplitude versus time) generated by the source (i.e., due to all the individual sources) varies with distance until, at a great enough distance, it starts having a stable shape. After the signal's shape becomes stable, its overall amplitude decreases inversely proportional to the distance. The region where the signature shape no longer changes significantly with distance is known as the "far-field," in contrast to the "near-field" region where the shape varies.

For large water-bottom depths, the source signature may be calculated using equivalent notional signatures for the individual sources. The equivalent notional signature is a tool for representing the contribution of an individual source to the signal in the far-field region, with each individual source contribution being decoupled from contributions of the other individual sources. As described in U.S. Pat. No. 4,476,553 and U.S. patent application Ser. No. 2013/0258808 (the entire contents of which are incorporated herewith by reference), equivalent notional signatures may be obtained using the near-field measurements and information about the individual sources' arrangement when the source is fired. The near-field measurements may be acquired by near-field sensors placed in proximity to each individual source (e.g., hydrophones about 1-2 m above each air-gun). The source signature that characterizes the signal actually penetrating the seafloor is a superposition of the notional signatures corresponding to each of the individual sources.

In the case of shallow water (called also "extreme shallow water" and meaning water-bottom depths up to 150 m), calculating notional signatures from the near-field sensor measurements becomes problematic because the near-field sensors also detect water-bottom reflections related to the signals that do not penetrate the seafloor. As exemplarily illustrated in FIG. 1, when air-gun 100 is fired in shallow water, a near-field sensor 110 placed above air-gun 100 detects: (A) an up-going direct (traveling straight from the air-gun to the near-field sensor) signal 120, (B) a water-air interface (i.e., water surface 10) reflection 130, (C) a first water-bottom reflection 140 of a down-going signal traveling from the air-gun to the seafloor 20, (D) a first water-bottom reflection 150 of a signal that has previously been reflected at the water-air interface, (E) a water-air interface reflection 160 of a signal similar to reflection 140, (F) a water-air interface reflection 170 of a signal similar to reflection 150, etc.

In contrast, if the water-bottom is deeper (i.e., not in the shallow water range), the near-field sensor detects only the up-going direct signal 120 and the water-air interface reflection 130. FIG. 2 is a graph of near-field measurements (i.e., amplitude versus time) for the same air-gun. Continuous line 210 is the near-field measurement for water-bottom deeper than 150 m. Dashed line 220 corresponds to a simulated water-bottom reflection such as 140 in FIG. 1. Dash double point line 230 corresponds to a simulated reflection such as 150 in FIG. 1. Line 240 is the measurement acquired with the near-field sensor for water-bottom depth in the shallow range. Line 240 is a sum of the values on lines 210, 220 and 230, and overlaps line 210 except for the time interval between 0.13 and 0.16 ms. Since the water-bottom reflections do not penetrate the seafloor, the near-field measurements in the shallow range are unsuitable for determining the signature usable in the seismic data processing.

An attempt to overcome this problem has been made by including the water-bottom reflections in the propagation model (as described in "Source signature estimation—Attenuation of the seafloor reflection error in shallow water,"

by J-F. Hopperstad and R. Laws, presented at EAGE 68$^{th}$ Conference & Exhibition, Vienna, Austria 12-15 Jun. 2006). However, this method requires precise knowledge of the water-bottom's depth and reflection coefficient over the surveyed area. These parameters with the required precision are not usually available throughout a complex surveyed area. Moreover, the water-bottom's reflection coefficient may not always be described as a scalar. Therefore, the propagation time to and from the water-bottom and amplitudes of water-bottom reflections may not be evaluated correctly using this approach.

Accordingly, it would be desirable to develop methods and apparatuses for determining the signature of the signal penetrating the seafloor during seismic surveys in shallow water.

SUMMARY

According to some embodiments, water-bottom reflection effect is removed from near-field measurements in shallow water, to enable their use for obtaining the signature of the signal penetrating the seafloor.

According to an embodiment, there is a seismic data processing method. The method includes receiving near-field measurements for a plurality of shots, the near-field measurements being recorded using a sensor placed close to an air-gun of a seismic source, during a seismic survey in a shallow water surveyed area. The method further includes obtaining a far-field initial estimate from stacked primary pulses in the near-field measurements. The method also includes water-bottom reflection portions for different depths using differences between the near-field measurements and the far-field initial estimate, each one of the water-bottom reflection portions corresponding to a specific depth and being estimated using a cluster of shots among the plurality of shots, the shots in the cluster corresponding substantially to the specific depth. Then, the method includes deblending a signature of the air-gun for each shot among the plurality of shots, from the near-field measurement for the shot and using the one of the water-bottom reflection portions according to a water-bottom depth for the shot. The deblended signature is then used to process seismic data related to the shot, the seismic data being acquired with receivers.

According to another embodiment, there is an apparatus for processing seismic data having a user interface and a data processing unit. The user interface is configured to receive or retrieve near-field measurements for a plurality of shots, the near-field measurements being recorded using a sensor placed close to an air-gun of a seismic source, during a seismic survey in a shallow water surveyed area. The data processing unit is configured to obtain a far-field initial estimate from stacked primary pulses in the near-field measurements, to estimate water-bottom reflection portions at different depths using differences between the near-field measurements and the far-field initial estimate, each one of the water-bottom reflection portions corresponding to a specific depth and being estimated using a cluster of shots among the plurality of shots, the shots in the cluster corresponding substantially to the specific depth, and to deblend a far-field signature of the air-gun for each shot among the plurality of shots, by subtracting the one of the water-bottom reflections according to a water-bottom depth for the shot. The deblended signature of the signal is then used to process seismic data acquired with receivers and related to the shot.

According to yet another embodiment, there is a computer readable medium non-transitorily storing executable codes which when executed on a computer make the computer perform a seismic data processing method. The method includes receiving near-field measurements for a plurality of shots, the near-field measurements being recorded using a sensor placed close to an air-gun of a seismic source, during a seismic survey in a shallow water surveyed area. The method further includes obtaining a far-field initial estimate from stacked primary pulses in the near-field measurements. The method also includes water-bottom reflection portions for different depths using differences between the near-field measurements and the far-field initial estimate, each one of the water-bottom reflection portions corresponding to a specific depth and being estimated using a cluster of shots among the plurality of shots, the shots in the cluster corresponding substantially to the specific depth. Then, the method includes deblending a signature of the air-gun for each shot among the plurality of shots, from the near-field measurement for the shot and using the one of the water-bottom reflection portions according to a water-bottom depth for the shot. The deblended signature is then used to process seismic data related to the shot, the seismic data being acquired with receivers.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a marine seismic source.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
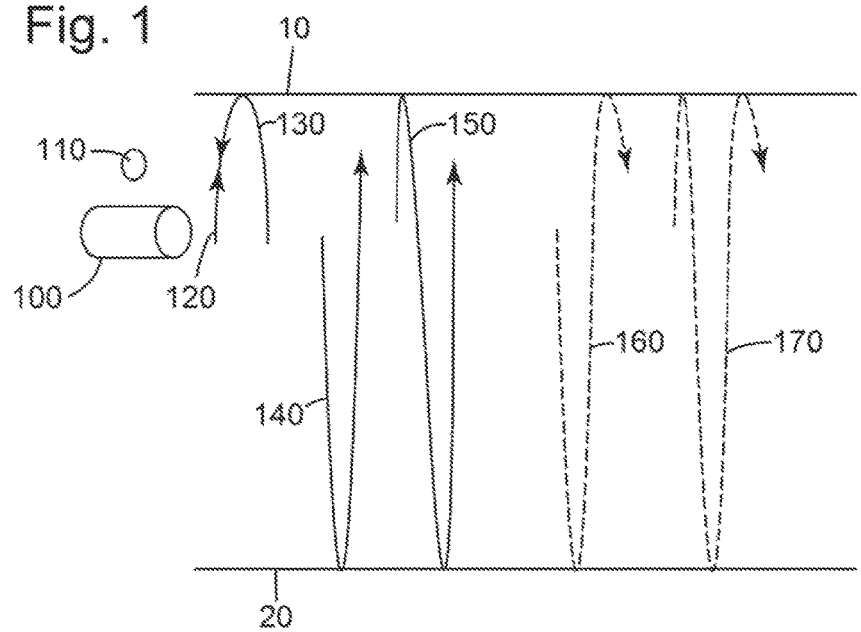
FIG. 1 is a schematic representation of signals detected by a near-field sensor in shallow water.
Figure 2:
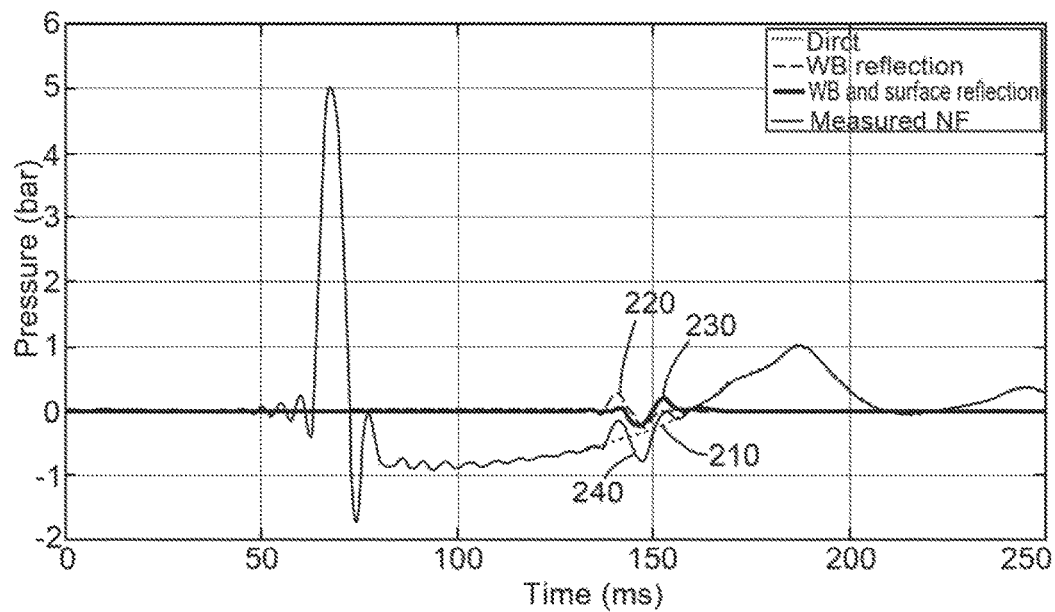
FIG. 2 is a graph illustrating amplitude versus time recorded by a near-field sensor placed near an air-gun.

The following methods and apparatuses use near-field measurements to obtain signatures in shallow water. The effect of the water-bottom reflections in shallow water on the near-field measurements is removed so that the signatures calculated thereafter are usable to process seismic data. In shallow water, a sensor (e.g., a hydrophone) placed close to an air-gun (e.g., 1-2 m above the air-gun) records a direct signal (e.g., 120 in FIG. 1), a reflection (e.g., 130 in FIG. 1) of the direct signal at the water surface (i.e., water-air interface), and other reflections at the water-bottom (e.g., 140-170 in FIG. 1). The direct signal and the reflection of the direct signal at the water surface form a primary pulse being stronger and arriving at the sensor earlier than the following reflections. If the contribution to the signature due to the air-gun for a shot i is calculated using the near-field sensor measurement, the result, $sig_i$, includes a substantially stable portion of the far-field signature FF, a shot-by-shot variation of the far-field signature $\delta FF_i$, a water-bottom-related portion $WB(d_i)$ due to the water-bottom reflections (which portion depends on the water-bottom depth $d_i$ for shot i), and a shot variation $\delta WB_i$ of this water-bottom-related portion:

$$sig_i = FF + \delta FF_i + WB(d_i) + \delta WB_i. \quad (1)$$

Magnitude of the terms added according to formula (1) have the following relationship:

$$FF > WB(d_i) >> \delta FF_i >> \delta WB_i. \quad (2)$$

Shot i's signature of the signal (or portion of the signal due to the air-gun if the source includes plural air-guns) actually penetrating the seafloor is:

$$sig_i^* = FF + \delta FF_i. \quad (2)$$

If the source includes plural air-guns, the air-guns' near-field measurements are used to calculate the notional signature for each of the air-guns (notional signatures taking into consideration, for example, arrangement and interaction of the air-guns). This type of methods (subject to continuous improvement) are well-known in seismic data processing, as described, for example, in the article, "The signature of an air gun array: Computation from near-field measurements including interactions—Practical considerations," by Ziolkowski et al., published in Geophysics, 48(2), 1984, pp 105-111, the entire content of which is incorporated herein by reference.

Figure 3:
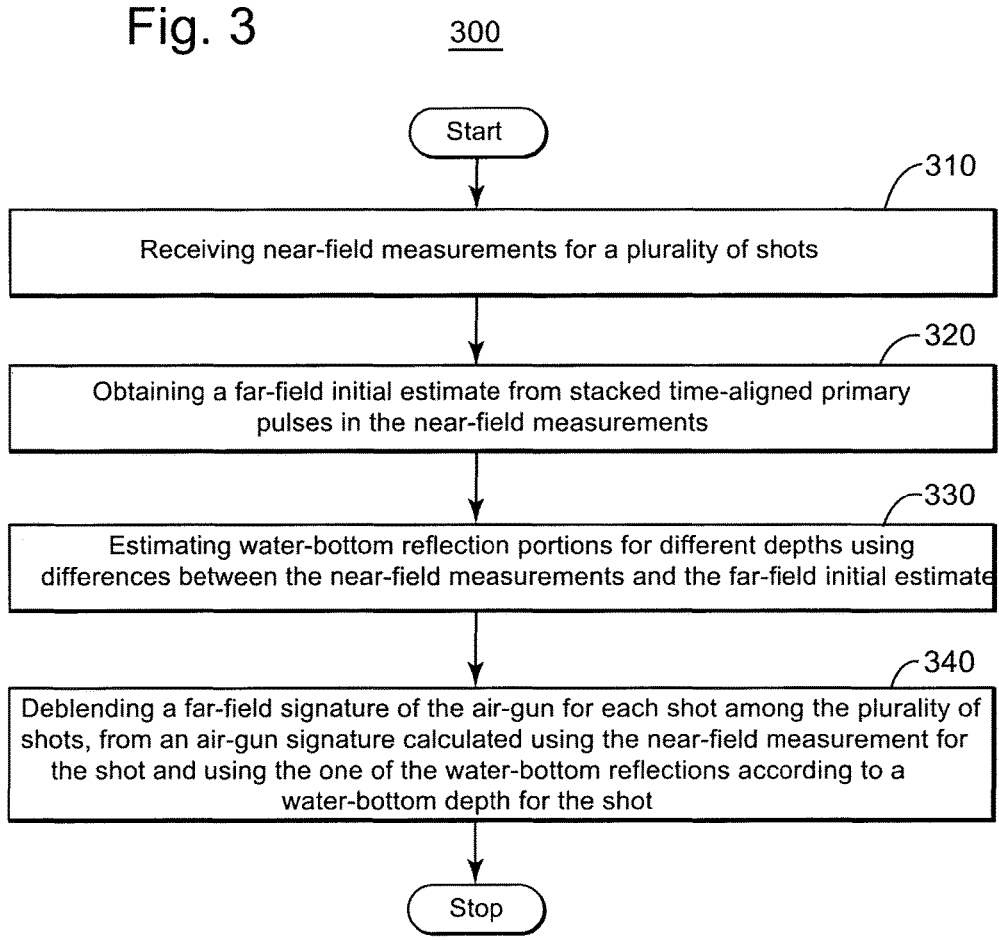
FIG. 3 is a flowchart of a method according to an embodiment.

FIG. 3 is a flow diagram of a method 300 deblending $sig_i^*$ from $sig_i$ according to an embodiment. Method 300 includes receiving near-field measurements for a plurality of shots, with the near-field measurements being recorded using a sensor placed close to an air-gun of a seismic source, during a seismic survey in a shallow-water surveyed area, at 310. Although the following description refers to a single sensor close to a single air-gun, it should be understood that near-field measurements may be recorded by plural near-field sensors associated with plural air-guns of a marine seismic source. Method 300's steps would then be applied for each of the air-guns separately, and notional signatures obtained for the air-guns would be combined to obtain source signatures for each shot.

Figure 4:
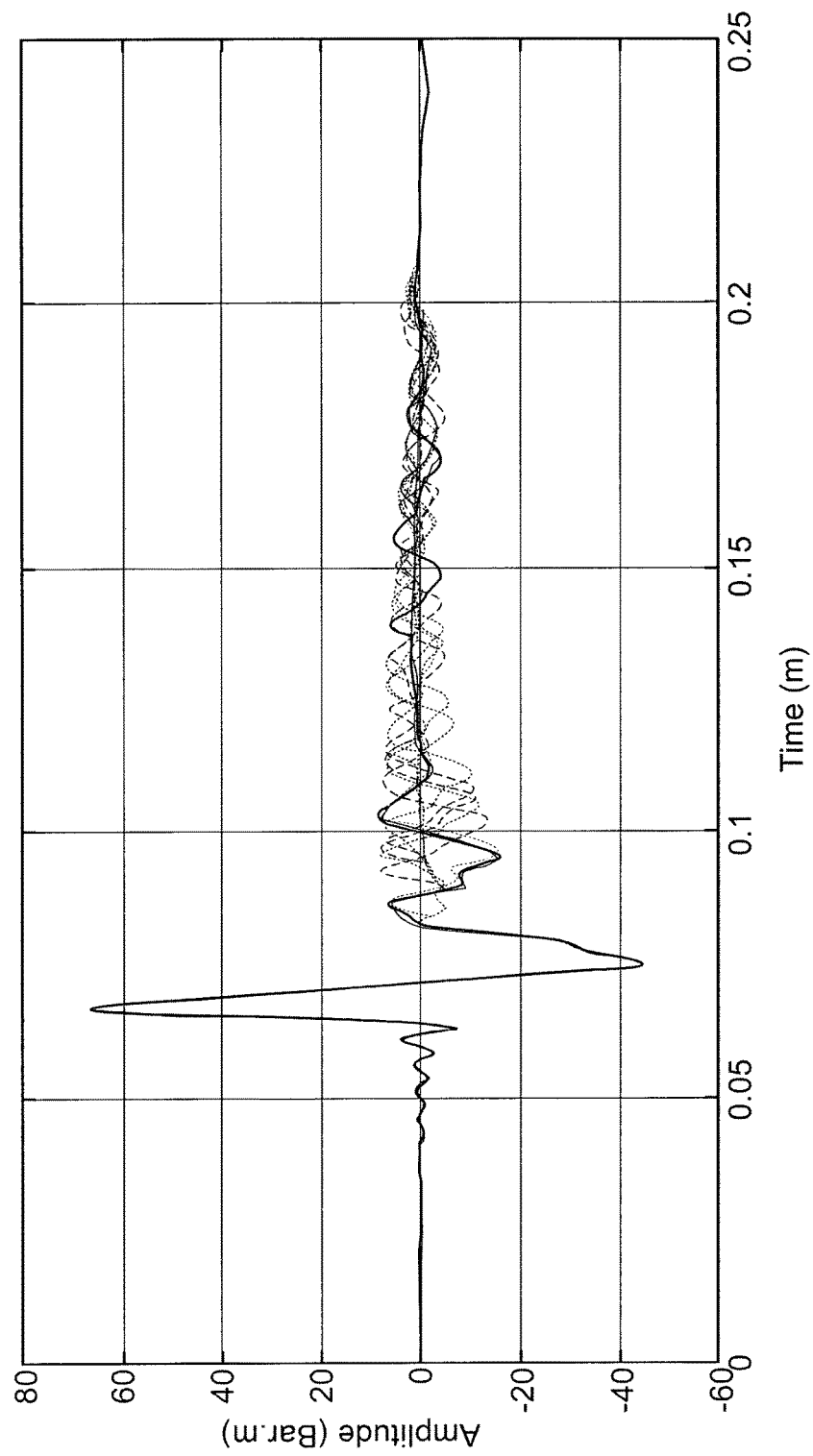
FIG. 4 is a graph illustrating an overlap (equivalent to a stack) of near-field measurements for different shots at locations having different water-bottom depths.

Method 300 then includes obtaining a far-field initial estimate from stacked primary pulses in the near-field measurements at 320. FIG. 4 is a graph of amplitude versus time illustrating an overlap (equivalent to a stack) of near-field measurements for different shots at locations having different water-bottom depths (between 20 m and 100 m). The primary pulses due to the direct signal (e.g., 120 in FIG. 1) and a direct signal reflection at the water surface (e.g., 130 in FIG. 1) occur substantially at the same time. The primary pulses' times depend on air-gun's depths, the near-field sensor's depths (the current depths at the time of the shot not the planned values) and the signal propagation velocity through water. Fluctuation of these parameters may yield small time shifts, which make a time-alignment necessary. However, up to about 0.75 ms, the near-field measurements substantially overlap independent of the different water-bottom depths. The pressure variations due to the water-bottom reflections occur at different later times after the primary pulses, depending on the water-bottom's depth, and have different phases (as seen, for example, in region 0.75-0.21 ms of the graph in FIG. 4). The stacked near-field measurements are used to obtain a far-field initial estimate calculated using the average common portion (e.g., up to 0.75 ms in FIG. 4).

Step 320 may include selecting a subset of the plurality of shots such that the selected shots have substantially the same signature, and time-aligning the primary pulses in the near-field measurements of the selected shots. During the seismic survey, the pressure variation output by the air-gun may change as a fluctuation (e.g., the air-gun occasionally operates at less than its full volume or at a lower pressure) or as a trend (e.g., the air-gun operating at lower pressure for a portion of the survey). In one embodiment, the shots used to obtain the far-field initial estimate are selected such that pressure in the air-gun has substantially the same value for the selected shots. This pressure may be measured by a sensor in the air-gun. If during the survey, the air-gun starts operating differently, then different far-field initial estimates are determined for the two (or more) operation periods.

Figure 5:
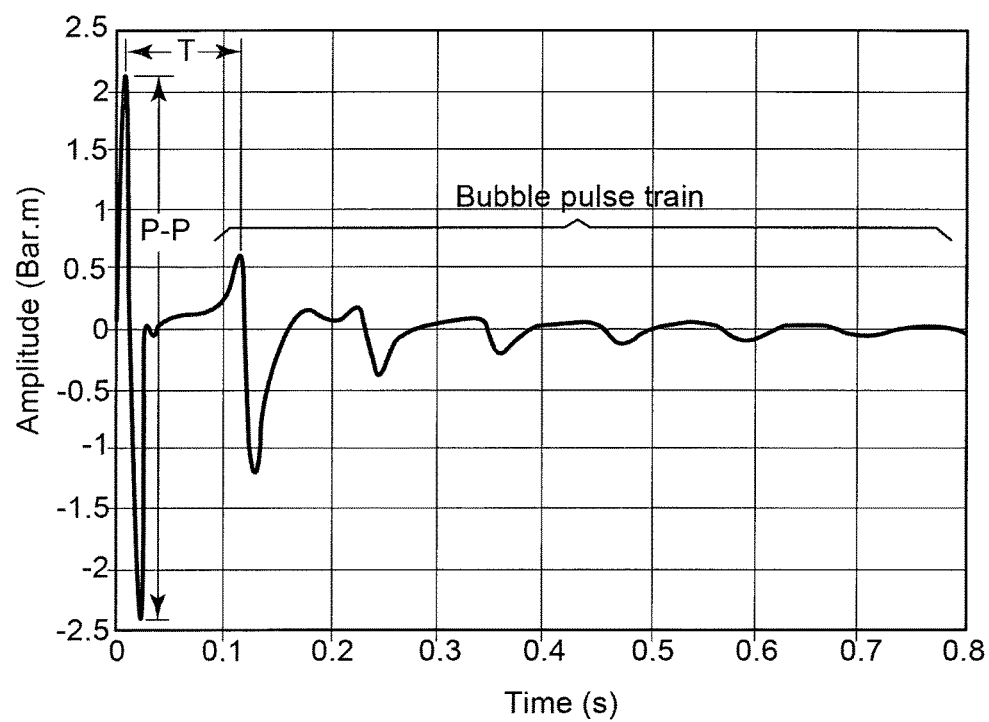
FIG. 5 is a graph illustrating pressure variation generated by an air-gun being fired.

In another embodiment, the shots used to obtain the far-field initial estimate are selected such that a bubble period of the air-gun for the selected shots has substantially the same value. To explain the bubble period parameter of an air-gun, a brief description of air-gun operation follows. An air-gun stores compressed air and releases it suddenly underwater when fired. The released air forms a bubble that expands because pressure inside the bubble is initially greater than the hydrostatic pressure in the surrounding water. As the bubble expands, the air pressure decreases, eventually becoming lower than the hydrostatic pressure. The bubble then begins to contract until the air pressure again becomes greater than the hydrostatic pressure. The process of expansion and contraction may continue through few cycles, causing a pressure variation (i.e., seismic or acoustic) signal that propagates through the water in all directions. The pressure variation generated in the water by the air-gun is illustrated in FIG. 5. Between highest pressure and the following lowest pressure, there is a peak pressure variation (P-P). The high-low cycle repeats, forming a bubble pulse train. The time T between successive pulses is the bubble period, and it may be used as a measure of air-gun stability in operation.

In yet another embodiment, the shots used to obtain the far-field initial estimate are selected so that shapes of the primary pulses in the near-field measurements of the selected shots to be similar. The shape similarity may be assessed using first derivatives of the shapes or may be established if corresponding samples of two near-field measurements (i.e., from two shots) are predominantly proportional (i.e., have the same ratio).

Method 300 then includes estimating water-bottom reflection portions at different depths, $WB(d_i)$ at 330. These water-bottom reflection portions are estimated using differences, $diff_i$, between the near-field measurements, $sig_i$, and the far-field initial estimate FF:

$$diff_i = sig_i - FF = \delta FF_i + WB(d_i) + \delta WB_i. \quad (3)$$

A water-bottom reflection portion corresponding to a specific depth, WB($d_i$), is estimated using a cluster of shots corresponding substantially to the specific depth $d_i$. Assuming that $\delta FF_i$ is random, it cancels out when considering the cluster of shots. Accurate knowledge of the water-bottom depth throughout the surveyed area (attainable via bathymetry) is not required since the clustered shots are in a small window around (substantially equal to) $d_i$. A reasonably good estimate of the water-bottom depth for the shots would suffice.

In one embodiment, step 330 may include filtering out $\delta FF_i$ using various known method such as predictive convolution. For a shot $\delta FF_i$ may be identified by focusing in the time window where the far-field signature occurs (e.g., up to 0.75 ms in FIG. 4). If in this time window the far-field initial estimate is removed, the remainder would be $\delta FF_i$. Another method for filtering out $\delta FF_i$ may employ deconvolving WB($d_i$), leaving only a sparse Dirac-like response, and then convolving with WB($d_i$). After filtering out $\delta FF_i$, and removing FF and WB($d_i$), the remaining $\delta WB$ may also be removed shot by shot.

Once the water-bottom reflection portions are known, the signature of a signal penetrating the seafloor is deblended for each shot at 340. The deblended signature is:

$$sig_i' = sig_i - WB(d_i) = FF + \delta FF_i + \delta WB_i \approx sig_i^*. \qquad (4)$$

Figure 6:
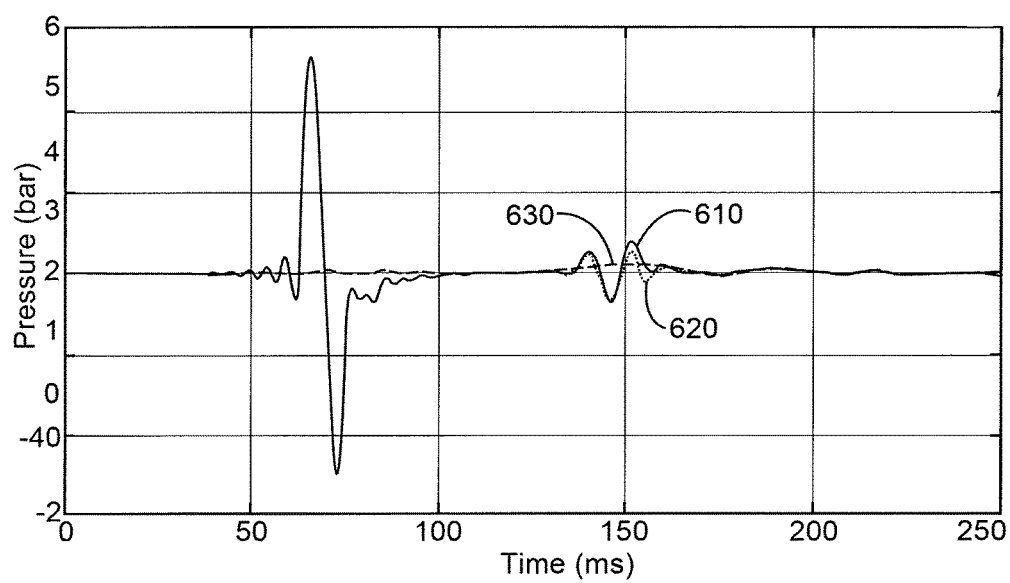
FIG. 6 is a graph of amplitude versus time for comparing signal signatures in shallow water and in deep water.

FIG. 6 is a graph of amplitude versus time in which continuous line 610 is $sig_i$, dashed line 620 is WB($d_i$) and dash-point line 630 is the difference between lines 610 and line 620, thus representing $sig_i'$.

The steps of method 300 may be performed iteratively to enhance the shot-by-shot result.

The signature of a signal penetrating the seafloor may then be used to apply designature to seismic data acquired with receivers after each of the shots to obtain shot-by-shot impulsive responses characterizing the formation under the seafloor in the shallow-water surveyed area. These shot-by-shot impulsive responses may be used to generate images of the formation which illustrate locations of interfaces between the formation's layers.

If the seismic source includes plural air-guns, the steps of method 300 are performed for each of the air-guns. The resulting signatures of the air-guns are combined in a source signature of the total signal penetrating the seafloor in the shallow water surveyed area. The source signature is used to apply designature to the seismic data to obtain the shot-by-shot impulsive responses usable to generate images of the investigated structure under the seafloor.

Figure 7:
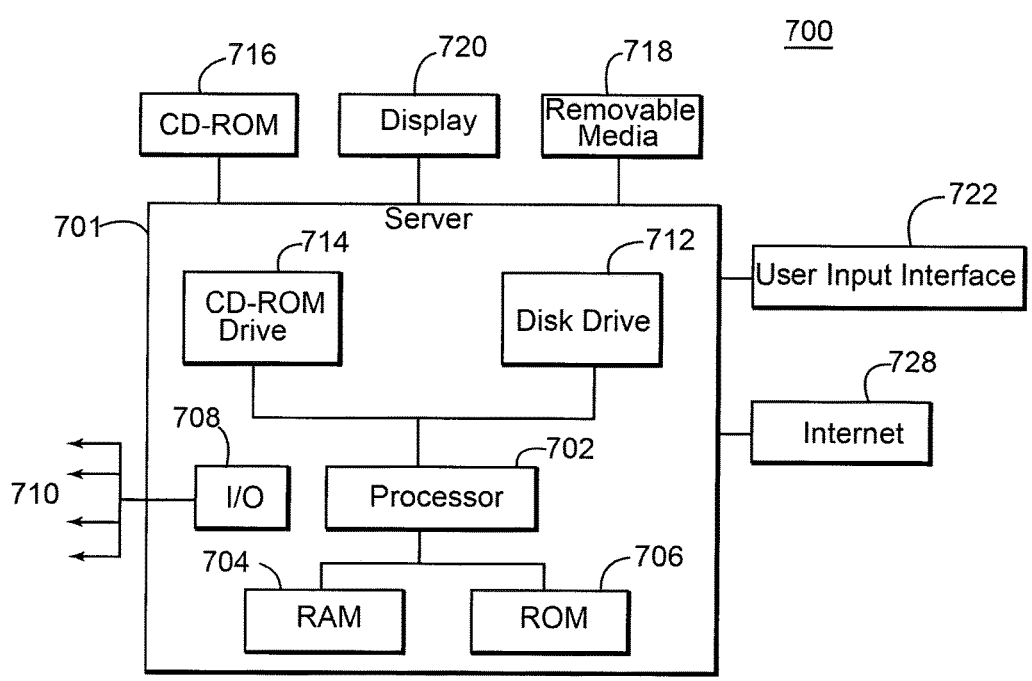
FIG. 7 is a block diagram of an apparatus according to an embodiment.

An apparatus 700 capable of carrying out operations in accordance with the above-discussed methods is illustrated in FIG. 7. Hardware, firmware, software or a combination thereof may be used to perform the various steps and operations described herein. Apparatus 700 may include server 701 having a central processor unit (CPU) 702 which may be coupled to a random access memory (RAM) 704 and to a read-only memory (ROM) 706. Memory 706 represents different types of storage media able to store executable codes. Thus memory 706 may be a programmable ROM (PROM), an erasable PROM (EPROM), etc. Central processor unit 702 includes one or more processors and may be configured to communicate with various internal and external components via input/output (I/O) circuitry 708 and bussing 710 to provide control signals and the like. Server 701 may also include disk drives 712, CD-ROM drives 714, and other hardware employed for reading and/or storing data, such as a DVD, etc. In one embodiment, software for carrying out the above-discussed steps may be stored and distributed on a CD-ROM 716, removable media 718 or other form of media non-transitorily storing information. The removable media may be inserted into, and read by, devices such as the CD-ROM drive 714, disk drive 712, etc. Server 701 may be coupled to a display 720, which may be any type of known display or presentation screen, such as LCD, plasma displays, cathode ray tubes (CRT), etc. A user input interface 722 including one or more user interface mechanisms such as a mouse, keyboard, microphone, touch pad, touch screen, voice-recognition system, etc., may be provided. Server 701 may be part of a larger network configuration as in a global area network (GAN) such as the Internet 728.

CPU 702, which includes one or more processors, is configured (A) to obtain a far-field initial estimate from stacked time-aligned primary pulses in the near-field measurements; (B) to estimate water-bottom reflections at different depths using differences between the near-field measurements and the far-field initial estimate, with each one of the water-bottom reflections corresponding to a specific depth and being estimated using a cluster of shots among the plurality of shots, with shots in the cluster corresponding substantially to the specific depth; and (C) to deblend a signature of the air-gun for each shot by subtracting one of the water-bottom reflections according to a water-bottom depth for the shot from the shot's near-field measurement.

Embodiments may be a computer program product which implements methods such as 300. Accordingly, the embodiments may take the form of an entirely hardware embodiment or a combination of hardware and software. The computer program product may be stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such as floppy disk or magnetic tape. Other non-limiting examples of computer-readable media include flash-type memories or other known types of memories.

The disclosed exemplary embodiments provide methods and seismic data processing apparatus removing water-bottom effect from near-field measurements to obtain signature of a signal penetrating seafloor in a shallow water surveyed area. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A seismic data processing method, comprising:
receiving near-field measurements for a plurality of shots, the near-field measurements being recorded using a sensor placed close to an air-gun of a seismic source, during a seismic survey in a shallow water surveyed area;
obtaining a far-field initial estimate from the near-field measurements corresponding to different depths stacked to have respective primary pulses time-aligned;
estimating water-bottom reflection portions corresponding to the different depths using differences between the near-field measurements and the far-field initial estimate, each one of the water-bottom reflection portions corresponding to a specific depth and being estimated using a cluster of shots among the plurality of shots, the shots in the cluster corresponding to the specific depth;
deblending a signature of the air-gun for each shot among the plurality of shots, from the near-field measurement for the shot and using the one of the water-bottom reflection portions according to a water-bottom depth for the shot;
using the deblended signatures to obtain shot-by-shot impulsive responses of a formation under the seafloor in the shallow water surveyed area, from seismic data acquired with receivers; and
generating an image of the formation based on the shot-by-shot impulsive responses, the image illustrating interfaces between layers of the formation.

2. The method of claim 1, wherein the obtaining of the far-field initial estimate includes:
selecting a subset of the plurality of shots, shots in the selected subset being expected to yield a same signature; and
obtaining the far-field initial estimate from the time-aligned primary pulses in the near-field measurements for the shots in the subset.

3. The method of claim 2, wherein the selecting is performed such that a bubble period of the air-gun has a same value for the shots in the subset.

4. The method of claim 2, wherein the selecting is performed such that a pressure in the air-gun before being firing the shot has a same value for the shots in the subset.

5. The method of claim 2, wherein the shots are selected so that shapes of the primary pulses in the near-field measurements of the selected shots to be similar.

6. The method of claim 1, further comprising:
after estimating the water-bottom reflections, filtering out shot-by-shot far-field variations.

7. The method of claim 6, wherein the shot-by-shot far-field variations are filtered out using predictive convolution.

8. The method of claim 1, wherein the deblending is performed iteratively.

9. The method of claim 1, wherein the seismic source includes plural other air-guns fired simultaneously with the air-gun when acquiring the seismic data and the receiving, the obtaining, the estimating and the deblending are performed for each of the other air-guns, the method further comprising:
calculating a source signature of the signal penetrating the seafloor in the shallow water surveyed area, using the deblended signatures of the air-gun and the other air-guns;
applying designature to the seismic data using the source signature for obtaining impulsive responses of the formation under the seafloor in the shallow water surveyed area; and
generating another image of the formation based on the impulsive responses.

10. An apparatus for processing seismic data, the apparatus comprising:
a user interface configured to receive or retrieve near-field measurements for a plurality of shots, the near-field measurements being recorded using a sensor placed close to an air-gun of a seismic source, during a seismic survey in a shallow water surveyed area; and
a data processing unit including one or more processors, the data processing unit being configured:
to obtain a far-field initial estimate from the near-field measurements corresponding to different depths stacked to have respective primary pulses time-aligned;
to estimate water-bottom reflection portions at different depths using differences between the near-field measurements and the far-field initial estimate, each one of the water-bottom reflection portions corresponding to a specific depth and being estimated using a cluster of shots among the plurality of shots, the shots in the cluster corresponding to the specific depth;
to deblend a far-field signature of the air-gun for each shot among the plurality of shots, by subtracting the one of the water-bottom reflections according to a water-bottom depth for the shot;
to use the far-field signature for obtaining shot-by-shot impulsive responses of a formation under the seafloor in the shallow water surveyed area, from the seismic data; and
to generate an image of the formation based on the shot-by-shot impulsive responses, the image illustrating interfaces between layers of the formation.

11. The apparatus of claim 10, wherein the data processing unit is configured to obtain the far-field initial estimate by:
selecting a subset of the plurality of shots, shots in the selected subset being expected to have a same source signature; and
obtaining the far-field initial estimate from time-aligned primary pulses in the near-field measurements for the shots in the subset.

12. The apparatus of claim 11, wherein the data processing unit is configured to select the shots such that a bubble period of the air-gun of the air-gun has a same value for the shots in the subset.

13. The apparatus of claim 11, wherein the data processing unit is configured to select the shots such that a pressure in the air-gun shortly before firing the shot has a same value for the shots in the subset.

14. The apparatus of claim 11, wherein the data processing unit is further configured to select the shots such that shapes of the primary pulses in the near-field measurements of the selected shots to be similar.

15. The apparatus of claim 10, wherein the data processing unit is configured to filter out the shot-by-shot far-field variations using predictive convolution.

16. The apparatus of claim 10, wherein the data processing unit is configured to deblend the far-field signature iteratively.

17. The apparatus of claim 10, wherein the seismic source includes plural other air-guns fired simultaneously with the air-gun when acquiring the seismic data, the near-field measurements include measurements using sensors placed close to each of the other air-guns, and the data processing unit is configured to obtain respective far-field initial estimates, to estimate water-bottom reflections and to deblend far-field signatures for each of the other air-guns, the data processing unit being further configured to calculate a source signature of the signal penetrating the seafloor in the shallow water surveyed area using the far-field signatures of the air-gun and the other air-guns;

to use the source signature for obtaining the impulsive responses of a formation under the seafloor in the shallow water surveyed area; and to generate another image of the formation based on the impulsive responses.

18. A computer readable medium non-transitorily storing executable codes which when executed on a computer make the computer perform a seismic data processing method comprising:

receiving near-field measurements for a plurality of shots, the near-field measurements being recorded using a sensor placed close to an air-gun of a seismic source, during a seismic survey in a shallow water surveyed area;

obtaining a far-field initial estimate from the near-field measurements corresponding to different depths stacked to have respective primary pulses time-aligned;

estimating water-bottom reflection portions corresponding to the different depths using differences between the near-field measurements and the far-field initial estimate, each one of the water-bottom reflection portions corresponding to a specific depth and being estimated using a cluster of shots among the plurality of shots, shots in the cluster corresponding to the specific depth; and deblending a signature of the air-gun for each shot among the plurality of shots, from the near-field measurement for the shot and using the one of the water-bottom reflection portions according to a water-bottom depth for the shot;

using the deblended signatures to obtain shot-by-shot impulsive responses of a formation under the seafloor in the shallow water surveyed area, from seismic data acquired with receivers; and generating an image of the formation based on the shot-by-shot impulsive responses, the image illustrating interfaces between layers of the formation.

* * * * *